Figure 6:
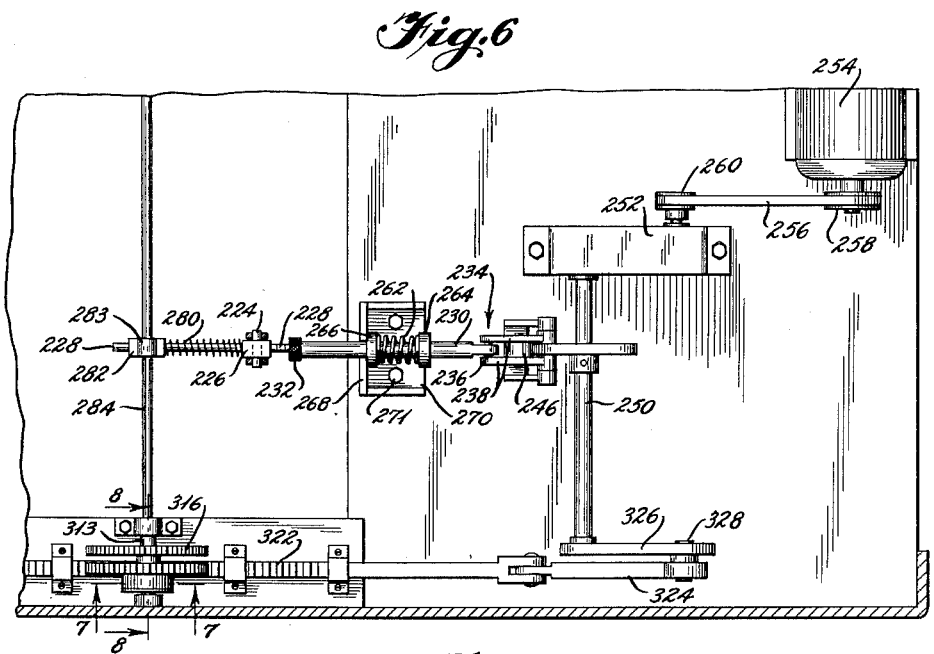

July 24, 1962  F. ALVAREZ  3,045,891
CONTINUOUS ENVELOPES
Filed Sept. 11, 1959  7 Sheets-Sheet 1
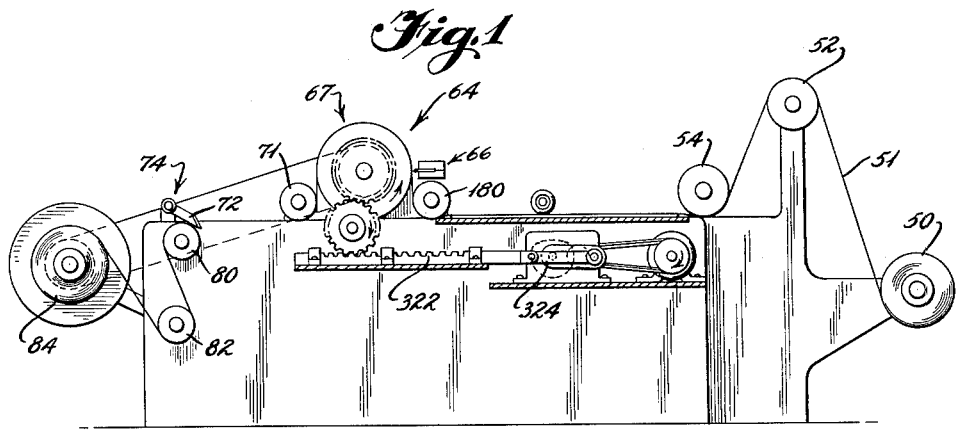
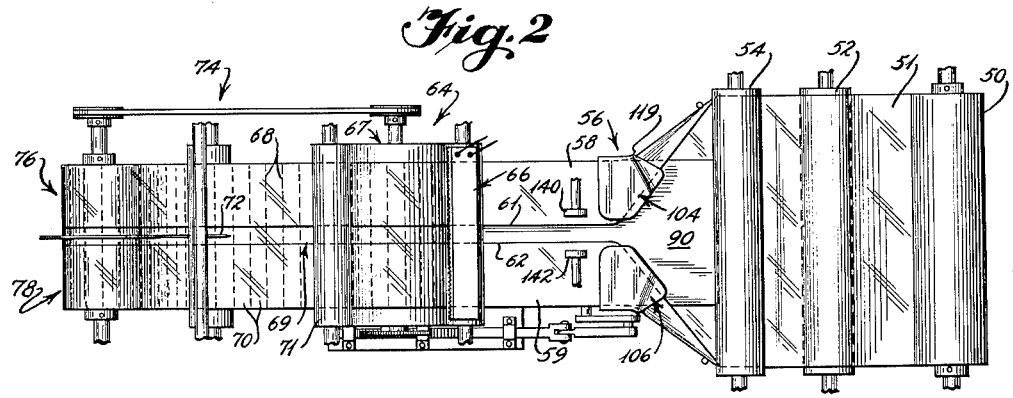
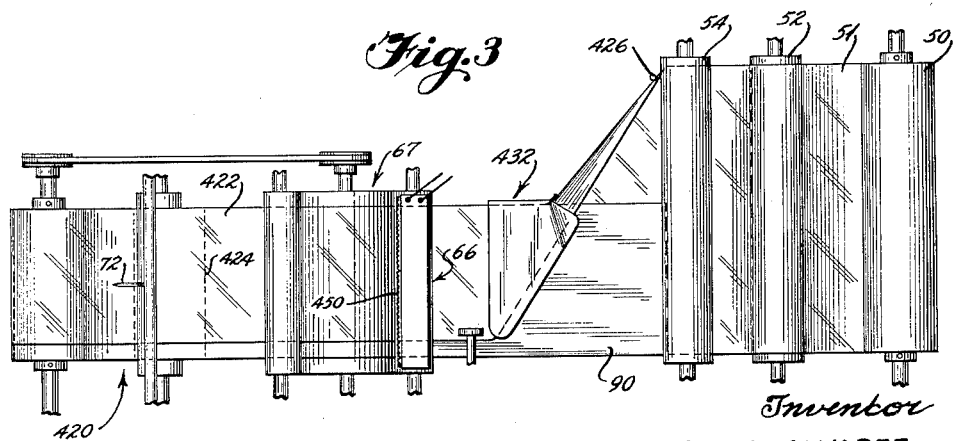
Inventor
FELIX ALVAREZ

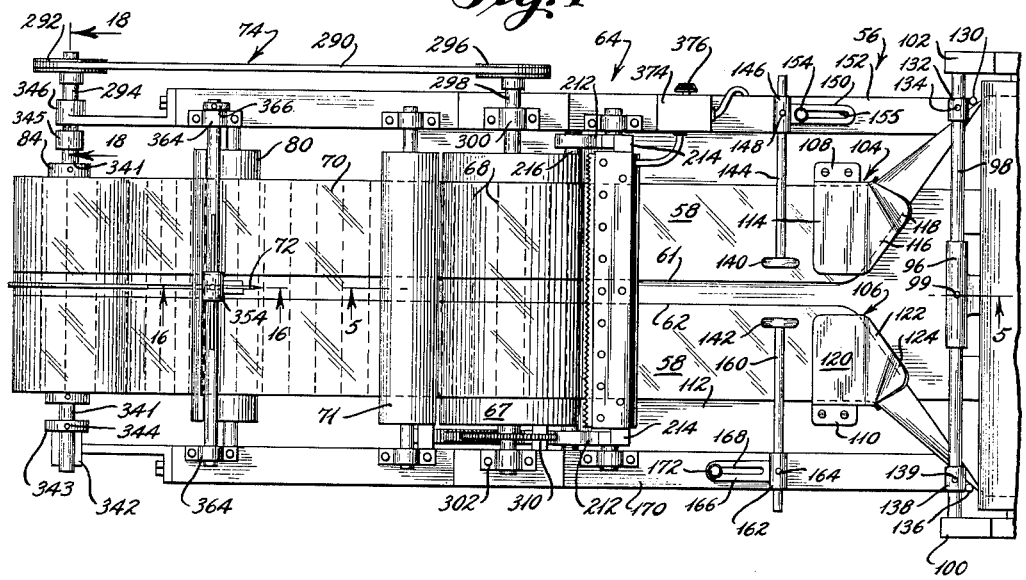

Inventor
FELIX ALVAREZ
Attorney

July 24, 1962
F. ALVAREZ
3,045,891
CONTINUOUS ENVELOPES
Filed Sept. 11, 1959
7 Sheets-Sheet 4
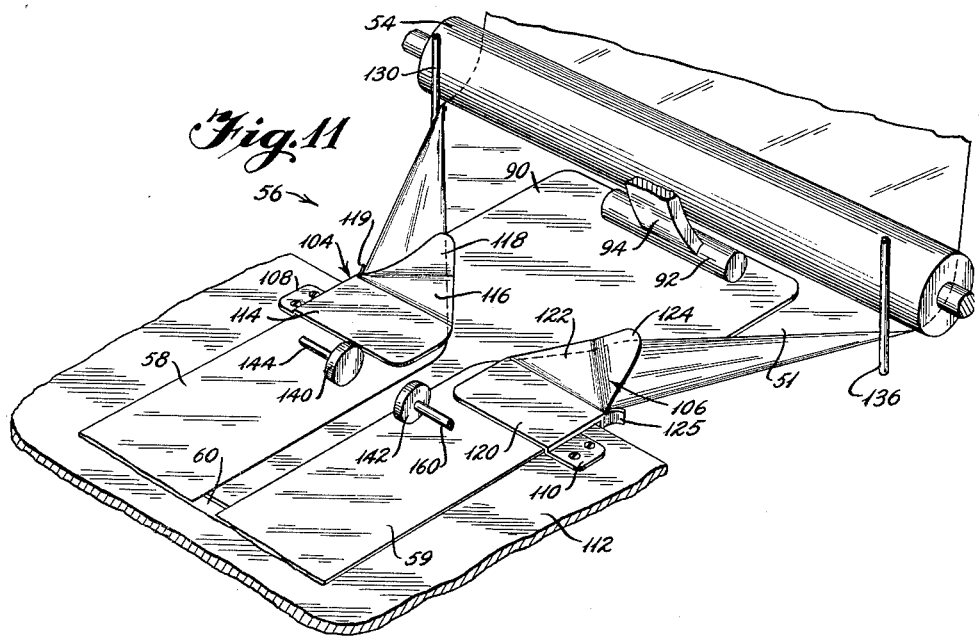
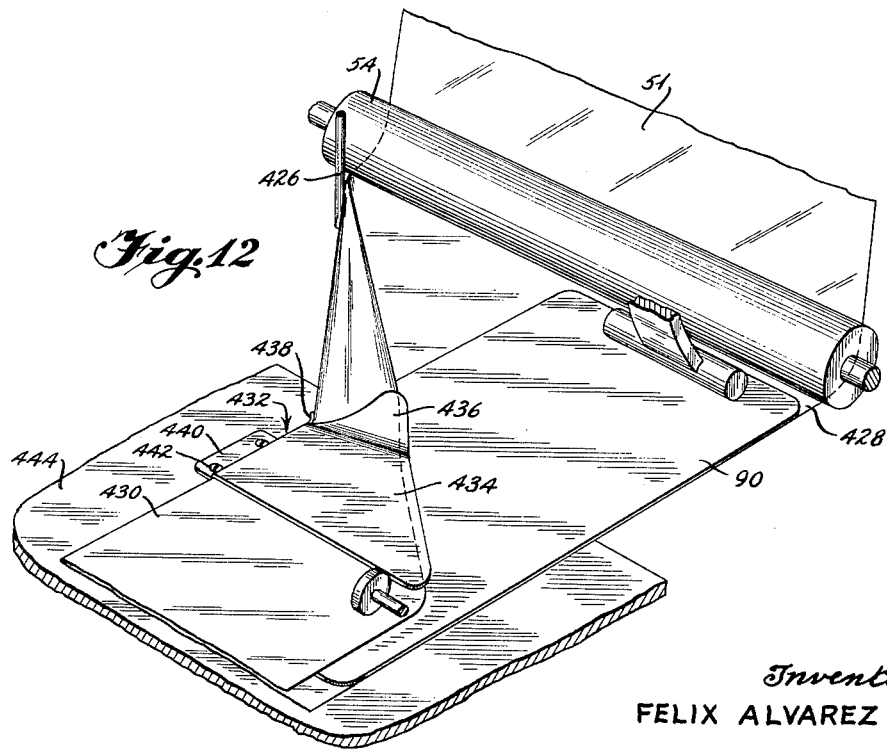
Inventor
FELIX ALVAREZ
Attorney

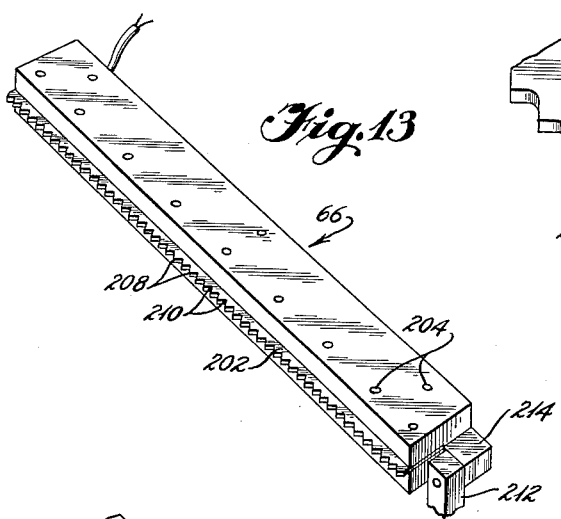
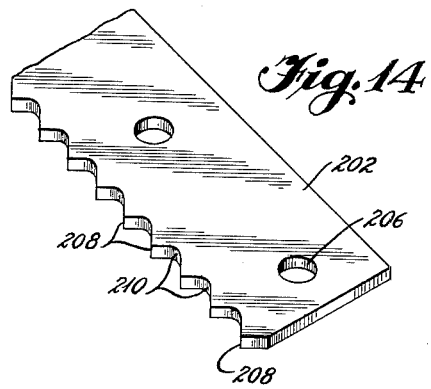
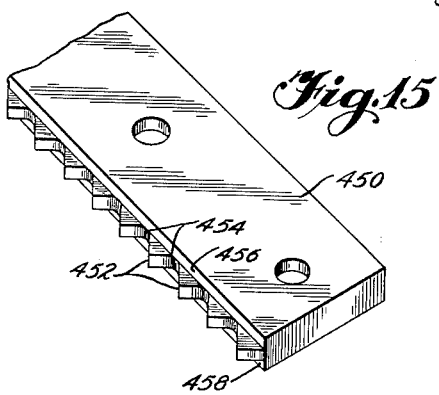
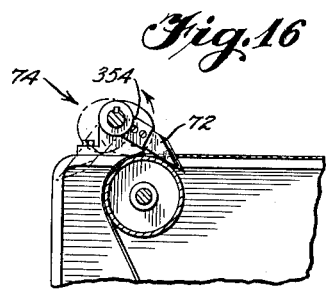
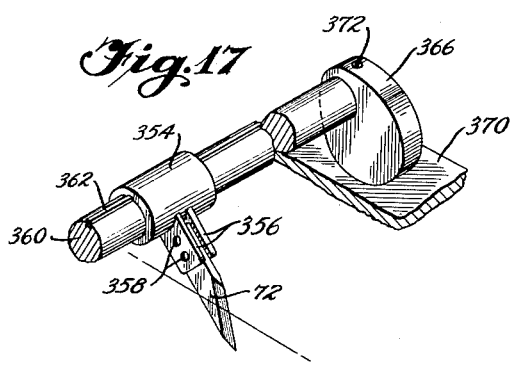
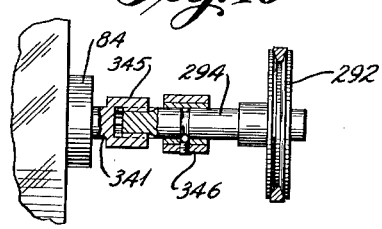

July 24, 1962 F. ALVAREZ 3,045,891
CONTINUOUS ENVELOPES
Filed Sept. 11, 1959 7 Sheets-Sheet 6
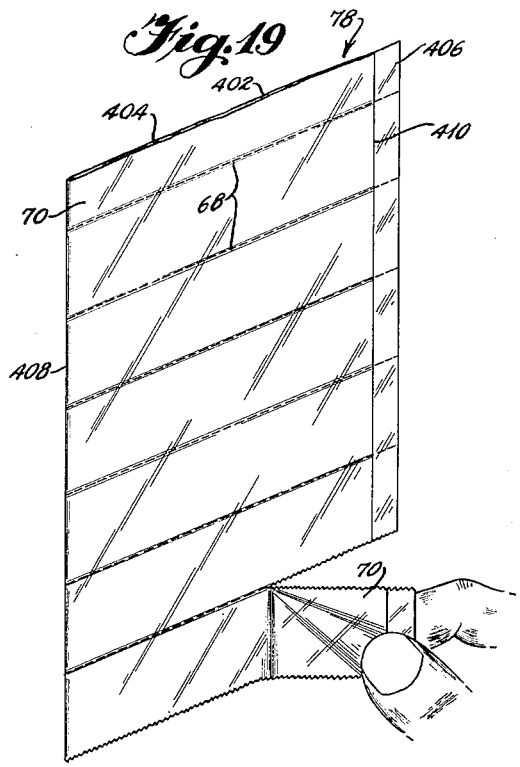
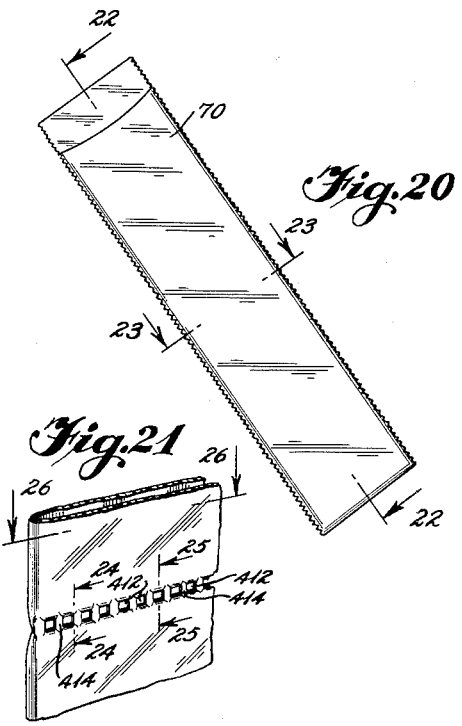
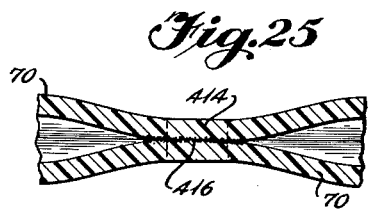
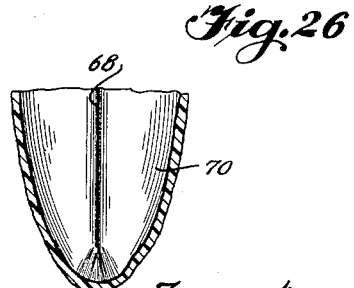
Inventor
FELIX ALVAREZ
By
Attorney July 24, 1962 F. ALVAREZ 3,045,891
CONTINUOUS ENVELOPES Filed Sept. 11, 1959 7 Sheets-Sheet 7

Inventor
FELIX ALVAREZ

By
Attorney

United States Patent Office 3,045,891
Patented July 24, 1962

3,045,891
CONTINUOUS ENVELOPES
Felix Alvarez, Pasadena, Calif., assignor to A ABA
Cellophane Products Corporation
Filed Sept. 11, 1959, Ser. No. 839,330
1 Claim. (Cl. 229—69)

This invention relates to the packaging of materials. Particularly, the invention relates to bags for economical and convenient packaging and to methods and apparatus for their manufacture.

Heretofore, various forms of flexible bags have been proposed for the packaging of materials. One type has been formed from a continuous tube of plastic material which is transversely sealed at spaced intervals and severed between transversely sealed portions to provide individual bags. This requires an instrument for a severing step which must occur before the bags can be filled.

It has also been previously proposed to provide a plurality of sealed containers formed from two sheets of thermoplastic material. The two sheets are laid over each other and sealed together along opposite edges. In addition, a plurality of transverse heat seals and perforation lines may be formed to divide the sheets into separable containers. The heat-sealing of the separate sheets requires careful alignment of the sheets and substantial machinery.

Heretofore, a multisection envelope assembly has been proposed including two blanks joined together by spaced adhesive areas and spaced grommets. The application of the adhesive to the prescribed areas requires expensive equipment.

It is an object of the present invention to provide an array of connected but readily detachable bags having openings which are accessible both prior to and subsequent to their detachment, permitting filling and sealing at either stage.

A further object of the invention is to provide an array of bags each having an individual opening for insertion of contents so that each bag in the array can be filled, sealed, and the array sold, whereby the consumer can manually separate a single bag from the array and open it when desired.

Another object of the invention is to provide a bag formed from flexible thermoplastic synthetic resin sheet material with its side edges sealed and a lip or flap extending from an opening therein for subsequent use in opening the sealed bag after the contents have been inserted and the bag sealed.

A further object of the invention is to provide a method for efficiently making arrays of bags from thermoplastic sheet material so that the individual bags can be filled without disconnecting a bag from the array.

A further object of the invention is to provide apparatus for making arrays of bags from sheets of thermoplastic sheet material.

Figure 7:
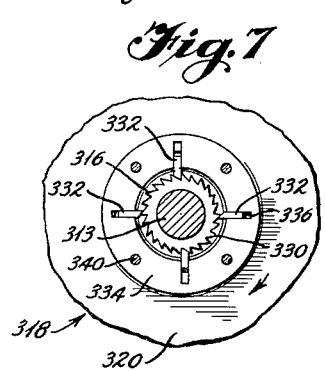
Figure 8:
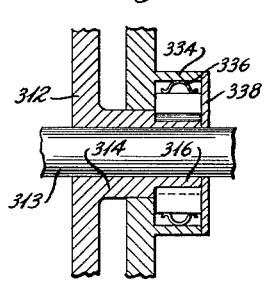
Figure 9:
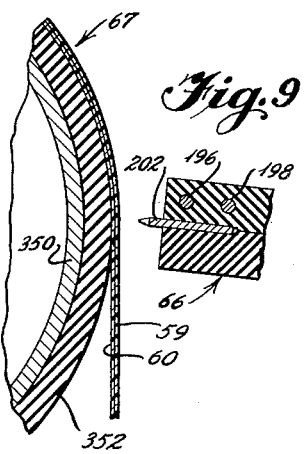
Figure 10:
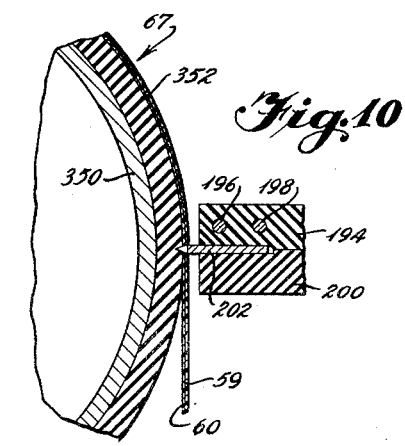

Other objects and advantages of the invention will be apparent from the following description taken in conjunction with the accompanying drawings wherein:

FIG. 1 is an elevation of a bag-forming machine embodying the invention, conventional apparatus being indicated diagrammatically;

FIG. 2, a top plan view of the bag-forming machine shown in FIG. 1 and illustrating the formation of two side-by-side arrays of bags;

FIG. 3, a top plan view of another embodiment of a bag-forming machine according to the invention for making a single array of bags wherein each bag extends the full width of the folded sheet material;

FIG. 4, a top plan view, on an enlarged scale, of a portion of the bag-forming machine shown in FIGS. 1 and 2 and forming a dual array of bags including two parallel rows of bags subsequently severed into two independent arrays each having one-half the width of the original array;

FIG. 5, a fragmentary vertical section taken along the line 5—5 of FIG. 4 and showing the mechanism for operating the heat-sealing and perforating bar;

FIG. 6, a horizontal fragmentary section taken along the line 6—6 of FIG. 5;

FIG. 7, a fragmentary vertical section along the line 7—7 of FIG. 6 illustrating the mechanism for rotating the drum in a step-by-step uni-directional manner;

FIG. 8, a fragmentary vertical section taken along the line 8—8 of FIG. 6 and showing further details of the drive mechanism illustrated in FIG. 7;

FIG. 9, a fragmentary vertical section through a portion of the bag-forming machine shown in FIG. 5 and showing, on an enlarged scale, the heat-sealing and perforating bar at a position spaced from the drum which advances the themoplastic sheets;

FIG. 10, a fragmentary vertical section, generally similar to FIG. 9, and showing the heat-sealing and perforating bar engaging the layers of thermoplastic sheet material to fuse them together and puncture them;

FIG. 11, a fragmentary perspective of a portion of the bag-forming machine shown in FIG. 2 and illustrating the elements which fold both edges of the original flat sheet material around opposite edges of the support plate so that a dual array of bags can be produced;

FIG. 12, a fragmentary perspective of a portion of the bag-forming machine shown in FIG. 3, illustrating the elements which fold the original sheet material around only one edge of the support plate to form a single show of bags;

FIG. 13, a perspective view of the heat-sealing and perforating bar employed in the bag-forming machine illustrated in the previous figures;

FIG. 14, a fragmentary perspective of the heat-sealing and perforating plate shown removed from the bar illustrated in FIG. 13;

FIG. 15, a fragmentary perspective of an alternate form of a heat-sealing and perforating plate for use in a bag-forming machine according to the invention, wherein flanges extend outwardly from both sides of the teeth of the plate;

FIG. 16, a fragmentary vertical section taken along the line 16—16 of FIG. 4 and showing the knife for severing the initial dual array into two independent arrays;

FIG. 17, a fragmentary perspective showing the knife illustrated in FIG. 16 and the apparatus for rotating the knife into inoperative position;

FIG. 18, a vertical section taken along the line 18—18 of FIG. 4 and showing mechanism for driving the take-up roll upon which the arrays of bags are accumulated;

FIG. 19, a perspective of a portion of an array of bags according to the invention and showing one bag being manually ripping detached from the array;

FIG. 20, an elevation of a single bag detached from the array shown in FIG. 19;

FIG. 21, a fragmentary perspective, on an enlarged scale, of a portion of the array of flexible bags shown in FIG. 19 and showing a line of perforations surrounded and connected by fused portions of the layers of sheet material;

FIG. 22, a longitudinal section, taken along the line 22—22 of FIG. 20, and shown broken away;

FIG. 23, a transverse section taken along the line 23—23 of FIG. 20 and shown broken away;

FIG. 24, a fragmentary section taken along the line 24—24 of FIG. 21 and showing a perforation or puncture through the layers of sheet material and the fused sealing surrounding the perforation;

FIG. 25, a fragmentary section taken along the line

Figure 27:
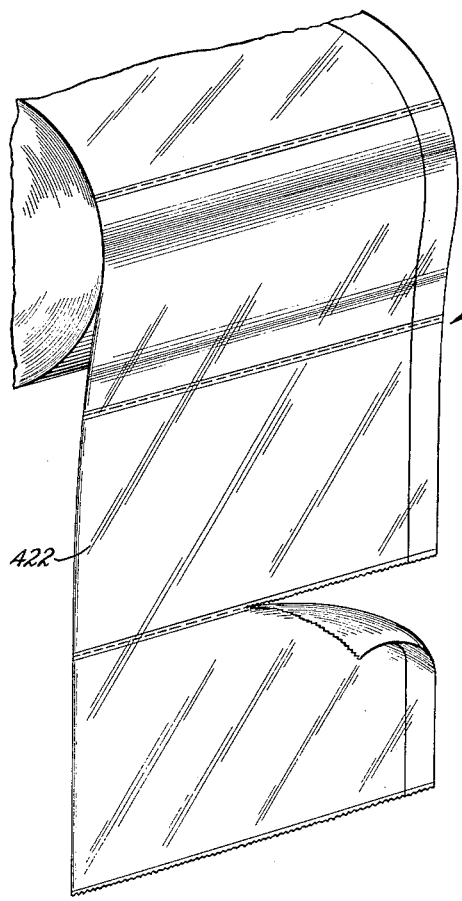
Figure 28:
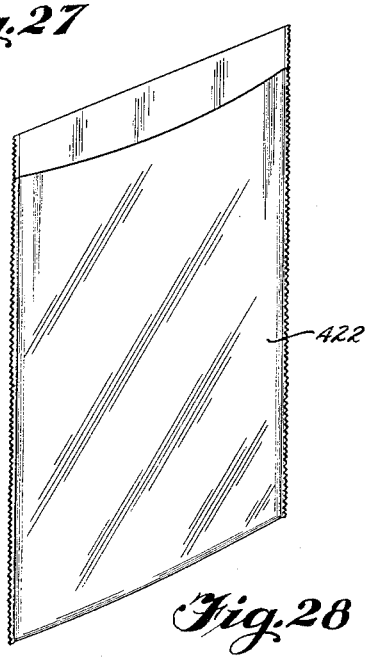
Figure 29:
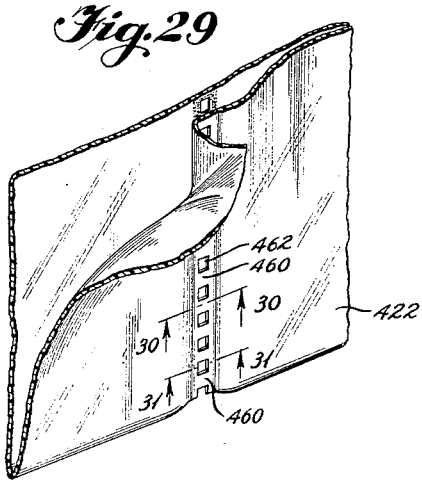
Figure 30:

25—25 of FIG. 21 and showing the fused and sealed line between the overlying layers of sheet material;

FIG. 26, an enlarged section taken along the line 26—26 of FIG. 21;

FIG. 27, a perspective of a rolled array of flexible bags according to the invention and showing the terminal bag partially ripping detached from the array, wherein the bags are proportioned and dimensioned to receive larger articles than the bag shown in FIG. 20;

FIG. 28, a perspective of a single bag attached from the array shown in FIG. 27;

FIG. 29, a fragmentary perspective showing a portion of the array of bags shown in FIG. 27 produced by using the form of heat-sealing and perforating plate shown in FIG. 15, wherein a wide seal is obtained to insure fluid-tight characteristics for the bag;

FIG. 30, a fragmentary section taken along the line 30—30 of FIG. 29; and

Figure 31:

FIG. 31, a fragmentary section taken along the line 31—31 of FIG. 29 and showing the wide seal surrounding each perforation.

Briefly stated, the invention includes apparatus for feeding a sheet of heat-sealable thermoplastic material from a source and folding the material along a longitudinal fold line so that two layers of the material overlie one another. From such folded material an array of side-by-side connected bags, open at one end, are formed by sealing the material to itself by the use of a blade-edge or bar type sealer along narrow transverse strips. Such bar may be formed with spaced teeth to product perforations in the fused strips for fusing the layers together along the strips and provides weakened portions of the strip intermediate their edges which permit an easy detachment of the bags from each other. The plate is combined with synchronously operated mechanism for moving the plate to engage portions of the overlying layers of plastic sheet material. The plate is electrically heated so that when the plate is moved to engage a transverse line extending across the two layers of sheet material, the two layers are fused together while the teeth form indentations or perforations extending through both layers and providing a weakened line for subsequent separation of individual bags from the arrays thereof.

Mechanism is provided for moving the sheet material intermittently and synchronized with the oscillations of the heat-sealing and perforating plate so that the plate engages the sheet material when the material is not moving and the sheet material is advanced along its path of movement during the intervals between engagements by the plate.

Where the sheet material has been folded initially along two fold lines, a knife is provided for severing the initial dual array into two independent arrays. The bag-forming machine according to the invention produces arrays of flexible bags, each having an opening formed along one edge of the array. The bags are connected along narrow transverse areas or strips which are weakened as by perforations for convenient ripping detachment. The bags can be sold in rolled form and can be filled with their contents without removal from the array.

Referring to the drawings, a bag-forming machine according to the invention is shown in FIGS. 1, 2, 4, 5, 11 and 16 to 18, and includes a roll 50 of heat-sealable synthetic resin thermoplastic sheet material, such as polyethylene. The polyethylene sheet or film 51 extends from roll 50 over guide roll 52 and under guide roll 54. The sheet 51 has its edge portions folded inwardly at folding station 56 so that two upper plastic panels 58 and 59 overlie the bottom plastic panel 60. The two upper panels 58 and 59 have their terminal edges 61 and 62, respectively, separated to form lips or flaps on the bags subsequently produced.

At the heat-sealing and perforating station 64, the sealing and perforating bar 66 is oscillated to successively move it into engagement with the panels of thermoplastic sheet material, as they pass around drum 67, to form spaced, transverse sealing strips or lines 68 including spaced perforations or punctures. Along the strips 68 the upper panels 58 and 59 are securely fused to the lower panel 60 of sheet material so as to form a dual array 69 of bags 70 having fluid-tight edges formed by the sealed strips 68. After leaving drum 67, the dual array 70 passes under roll 71.

Referring particularly to FIGS. 11 and 18 in conjunction with FIGS. 1 and 2, a knife 72 is provided at a cutting station 74 for severing the bottom plastic panel 60 along the middle thereof to separate the dual array 69 into two arrays 76 and 78 of polyethylene bags which are rove around roll 80, roll 82, and finally around take-up or rewind roll 84.

Referring particularly to FIGS. 4 and 11, the folding station 56 of the bag-forming machine includes a supporting plate 90 suspended from above and pressed downwardly on the upper surface of sheet material 51. The plate 90 has its forward end welded to a roll 92 connected to a bar 94 having a sleeve 96 formed at its upper end through which a rod 98 extends. Set screw 99 extends through sleeve 96 and engages bar 98. The rod 98 supports the bar 94 and plate 90. The rod 98 is secured to standards 100 and 102 mounted on opposite sides of the machine.

To fold the sheet 51 inwardly upon itself, a pair of contoured folding plates 104 and 106 are provided having offset feet 108 and 110, respectively, secured to base 112. The folding plate 104 includes a horizontal portion 114, an upwardly extending intermediate portion 116, a terminal portion 118 extending at an angle to intermediate portion 116 and a deflecting ear 119. Similarly, folding plate 106 includes horizontal portion 120, an intermediate deflecting portion 122, a terminal portion 124 extending at an angle to intermediate portion 122, and a deflecting ear 125.

Further to aid in folding the original sheet 51 inwardly from both sides upon itself, a vertical pin 130 is provided, as seen in FIG. 11, and is positioned adjacent roll 54. The pin 130 has its upper end secured to a sleeve 132 through which rod 98 passes. Set screw 134 releasably secures the sleeve 132 on rod 98.

Similarly, another vertical pin 136 is positioned adjacent the opposite end of roll 54 and has its upper end connected to sleeve 138 through which rod 98 extends. Set screw 139 releasably positions the sleeve 138 on the rod 98.

In order to press the upper plastic panels 58 and 59 firmly down against the support plate 90, a pair of wheels 140 and 142 are positioned for free rotation and are pressed downwardly against the plastic panels 58 and 59. Referring to FIG. 4, the wheel 140 is rotatably mounted on shaft 144 extending through the sleeve 146 and held therein by set screw 148. A slotted plate 150 extends from sleeve 148 and is held mounted on frame side 152 by a screw 154 extending through the slot 155 therein.

Similarly, the wheel 142 is rotatably mounted on shaft 160 extending through sleeve 162 and releasably held therein by set screw 164. The plate 166 is secured to sleeve 162 and extends therefrom with a slot 168 formed therein. The plate 166 and sleeve 162 are held in position on frame side 170 by a screw 172 extending through the slot 168 and into the frame side 170.

The folded sheet material is now passed to the heat-sealing and perforating station 64. The folded dual array 69 passes, as seen in FIG. 5, from the left end of support plate 90 around guide roll 180 and upwardly around drum 67. The heat-sealing and perforating bar 66 includes an upper support block 194 having electric leads 196 and 198 extending therethrough for heating of the entire bar 66. A support block 200 is located beneath support block 194. The plate 202 is releasably held between the support blocks 194 and 200 by screws 204, seen in FIG. 13, extending through registering holes formed in the blocks 194 and 200 and through the holes seen in FIG. 14.

For forming spaced indentations or punctures in the thermoplastic material, the plate 202 has a plurality of sharp-edged teeth 208 formed on its contact edge and spaced from each other by grooves 210.

While the plate 202 is shown having a plurality of teeth 208, the plate can have other forms which form fused strips with weakened portions intermediate their edges. The heat-sealing and perforating bar 66 is supported at opposite ends by lever arms 212 secured to extensions 214 extending from the opposite ends of lower support block 200. The levers 212 have their lower ends secured to rotatable rod 216 as seen in FIG. 5 and journaled in bearings mounted on the machine.

To provide for oscillation of the rod 216, an arm 218 is secured thereto and extends downwardly therefrom, terminating in a fork-shaped end having two legs 220 and two legs 222 positioned on opposite sides of a pin 224 extending from a sleeve 226, as seen in FIG. 6. The sleeve 226 is mounted on a spindle 228 threadedly connected to rod 230. A lock nut 232 maintains the spindle 228 adjustably connected to rod 230.

The rod 230 has its right hand end, as viewed in FIG. 5, pivotally connected to a follower 234 by a pin 236 extending between two horizontal arms 238 of follower 234. A pair of follower legs 240 extend downwardly from arms 238 and are pivotally connected to fixture 242 mounted on base plate 244. The follower 234 also includes a cam follower roller 246 rotatably journaled in opposed arms 238 and engaging the surface of cam 248 rotating with shaft 250 driven through gear box 252 by electric motor 254 connected to gear box 252 by drive belt 256 and drive pulleys 258 and 280.

To maintain the cam follower 234 in contact with the surface of cam 248, a helical compression spring 262, as seen in FIG. 5, surrounds the rod 230 and has one end engaging nut 264 secured to the rod 230 by set screw 265. The opposite end of spring 262 abuts against a sleeve 266 through which rod 230 slides. The sleeve 266 abuts against a vertical plate 268 of an angle iron having its horizontal plate 270 secured to base plate 244 by bolts 271.

To cushion the backlashing occuring during rapid oscillation of the heat-sealing and perforating bar 66, another coil spring 280 surrounds the spindle 228 and has one end abutting against sleeve 226 and its opposite end abutting agianst fitting 282 having an aperture formed therein slidably receiving spindle 228. The fitting 282 has an ear 283 formed thereon with a hole formed therein slidably and rotatably receiving a rod 284 extending between the sides of the machine.

Apparatus is provided for synchronizing the oscillation of levers 212 and bar 66 with the movement of the polyethylene sheet material. To draw the sheet material through the bag-forming machine, the take-up roll 84 and the drum 67 are positively driven. A drive belt 290, seen in FIGS. 2 and 4, is rove around pulley 292 secured to the end of stub shaft 294 driving the take-up roll 84. The drive belt 290 is also rove around the pulley 296 secured to the shaft 298 supporting the drum 67. The shaft 298 is journaled in bearings 300 and 302 mounted, respectively, on frame sides 150 and 170. While the bearings on the various shafts and rolls are not described in detail, such mountings are conventional and their detailed description is omitted because it would merely tend to obscure the invention.

To provide for positively driving the drum 67 by the motor 254, the end of shaft 298 opposite pulley 296 has a gear 310 secured thereon for rotation therewith. This gear is intermittently driven in one direction by a gear 312, seen in FIG. 6, rotatably positioned on a stub shaft 313 and having a hub 314, seen in FIG. 8, with a diminished hub portion 316 extending therefrom. A one-way clutch arrangement generally indicated by the numeral 318, seen in FIGS. 7 and 8, is provided for converting the continuous power of motor 254 to an intermittent, unidirectional rotation of the gear 312. The clutch 318 includes a gear 320 rotatably mounted on hub 314 and driven in oscillatory fashion by a rack 322 pivotally connected to a pitman 324 that is pivotally connected to a crank 326 by a pin 328. The crank 326 is mounted on shaft 250 so as to rotate in unison with the cam 248 that moves the heat-sealing and perforating bar 66 into and out of engagement with the superimposed panels of polyethylene sheet material, as previously described.

The clutch 318 converts the oscillatory motion of gear 320 into a unidirectional intermittent motion of gear 312. This is accomplished by providing, as seen in FIGS. 7 and 8, ratchet teeth 330 formed on the hub extension 316. Four pawls 332 sildably reciprocate in slots formed in hub 334 of gear 320. Each pawl 332 is pressed by a spring 336 into yielding engagement with ratchet teeth 330. A plate 338 is provided at the end of hub 334 for maintaining the pawls in their respective slots. The plate 338 is secured to the hub 334 by four circumferentially-spaced bolts 340.

The mechanism hereinabove described is proportioned and dimentioned so that the drum 67 is not rotating when the heat-sealing and perforating bar 66 engages polyethylene sheets on the surface of the drum.

Referring to FIGS. 4 and 18, apparatus is provided for disconnecting the take-up roll 84 from the machine. Referring to FIG. 4, the take-up roll 84 is supported on a shaft 341 having one end journalled in bearing 342 extending from frame side 170. A sleeve 343 is releasably positioned on shaft 341 by set screw 344.

The opposite end 345 of shaft 341 is enlarged and recessed and splinedly drivingly connected to stub shaft 294 journaled in bearing 346 extending from frame side 152. After a load of bags 70 has been wound on roll 84, the roll can be disconnected from the machine by loosening set screw 344, sliding sleeve 343 on shaft 341, withdrawing shaft 341 from splined connection with stub shaft 294, and lifting roll 84 from the machine.

In order that the layers of sheet material will be properly perforated, the drum 67 includes an inner cylinder 350, which may be of metal, and an outer cylinder 352 formed of rubber or polytetrafluoroethylene, as seen in FIGS. 9 and 10. When the heat-sealing and perforating plate 202 engages the sheets of polyethylene, the teeth 208 will indent the surface of the rubber cylinder 352 so that the areas of the panels of material surrounding the holes will be thoroughly fused together to provide a liquid-tight seal around these holes.

The knife 72, which severs the sealed and perforated dual arrays 69 into two separate arrays 76, 78, is secured to a sleeve 354 having two arms 356 extending therefrom and grasping the knife 72 therebetween. Screws 358 extend through the arms 356 and the knife 72 to releasably maintain them in mutual engagement. The sleeve 354 surrounds a shaft 360 and is keyed thereto by a key sliding in mating slots in sleeve 354 and shaft 360. The shaft 360 has its opposite ends journaled in bearings 364, as seen in FIG. 4. A pair of eccentric weights 366 are secured to shaft 360 on opposite sides of the dual array 69 as seen in FIGS. 4 and 17. The weights 366 rest on plate 370 and are releasably secured to the shaft 360 by set-secrews 372. By manipulating the weights 366 to the dotted line position shown in FIG. 16, the knife 72 is moved out of position to engage the double array 69, as when no severing is necessary.

The inoperative position of the knife 72 is employed when the machine is adapted to initially form a single array of plastic bags, as in the embodiment of FIGS. 3 and 12, hereinafter described.

Electric power is supplied to the leads 194 and 196, located in the heat-sealing and perforating bar 66, through cable 372 extending from thermostat 374 to the bar 66. Referring to FIG. 4, the thermostat 374 has an operating knob 376 for adjusting the temperature of the heat-sealing and perforating bar 66. A cable 378 extends from the thermostat 374 to an appropriate source of electrical power.

The mode of operation, and the method of the invention, as illustrated in FIGS. 1, 2, 4, 5, 6 and 11, will now be described. The machine is loaded with a roll 50 of thin polyethylene sheet material.

Electrical current is supplied through thermostat 374 to heat bar 66. The leading edge of the sheet 51 is manually led over roll 52, under roll 54 and beneath supporting plate 90. The sides of the sheet 51 are folded over to overlie the upper surface of supporting plate 90 and pass beneath the folding plates 104 and 106. The double layer of folded sheet material is drawn from the opposite end of support plate 90 upwardly around the roll 180 and the drum 67, beneath roll 71 past severing station 74, around roll 80, beneath roll 82 and is secured to take-up roll 84. The knife 72 is rotated to the full line position shown in FIG. 16 so as to sever the sheet material.

Next, the motor 254 is started. The drive belt 256, driven by motor 254 through pulley 258, actuates reduction gear mechanism 252 to produce a continuous relation of shaft 250. The crank 326 is rotated by shaft 250 to produce, through a pitman 324, reciprocation of rack 322 and oscillation of gear 320. Referring to FIG. 7, when the gear 320 is rotated in a clockwise direction, the springs 336 press the pawls 332 into engagement with the ratchet 330 to drive the ratchet and the hub 316 and gear 312 connected thereto. These intermittent unidirectional rotations of the gear 312 are transmitted to the gear 310 to drive the drum 67 and, by frictional engagement with the double array 69, advance the array. The take-up roll 84 is driven in unison with the drum 67 by means of the drive belt 290 rove around the pulleys 292 and 296.

When the gear 320 rotates in a counter-clockwise direction, as viewed in FIG. 7, the pawls 332 slip over the teeth of ratchet 330 so that the ratchet, with its connected gear 312, does not rotate. During these periods, the double array 69 is not advanced and the sealing and perforation thereof are accomplished as hereinafter described.

The folding of the sheet 51 is accomplished by the action of the folding plates 104 and 106, the pins 130—136 and the wheels 140–142.

During the periods when the drum 67 is rotating, the high portion 399 of cam 248 presses the cam follower 234 to move the rod 230 and spindle 228, to the left as seen in FIG. 5. The pin 224 pivots the arm 218 and causes consequent pivoting of rod 216. The levers 212, connected to rod 216, are pivoted to move the heat-sealing and perforating bar 66 out of engagement with the double array 69. During those periods when the drum 67 is not rotating, the low portion 400 of cam 248 is in position facing cam follower roll 246 so that the rod 230 and spindle 228 are moved to the right, referring to FIG. 5, by the spring 262. The pin 224 pivots the arm 218 in a counterclockwise direction as viewed in FIG. 5. The thus produced pivoting of rod 216 pivots the levers 212 to move the bar 66 so that the plate 202, electrically heated, engages the double array 69 to fuse the superposed layers together and produce the lines of perforations in the strips 68. The double array 69 of bags 70 is severed as it is drawn past knife 72 into the pair of independent arrays 76 and 78. The arrays 76 and 78 are wound around take-up roll 84.

Referring to FIGS. 19–26, a portion of bag array 78 is shown in FIG. 19, and includes a plurality of bags 70 separated by sealed and perforated strips 68. Each bag 70 includes a back panel 402 lying adjacent a front panel 404. The back or rear panel 402 extends beyond one end of front panel 104 to form a lip or flap 406. Each bag 70 is closed on three sides, that is, along the bottom fold line 408, and the two opposite heat-sealed and perforated strips 68. Each bag is open for the insertion of contents along top edge 410 of front panel 404 where the panels 402 and 404 are unconnected to each other. Among the contents which can be inserted in the bags are medicinal capsules, ointments, toys, etc. The bags can also be used for containing other liquids or gases, since the ripping detachment of a single bag from the array does not break the fluid-tight seal of the bag. After the insertion of the contents (not shown), the bags can be sealed by applying a heat-sealing bar adjacent the top edge 410 of upper layer 404.

Referring to FIG. 20, a bag 70 can be detached from array 69 before insertion of the contents if convenient to the needs of the consumer. Referring to FIGS. 24 and 25, each sealed and perforated strip 68 includes spaced holes or punctures 412 with bridge portions 414 therebetween. The fused area indicated by numeral 416 in FIG. 25 extends for at least the full width of the hole 412. Further, the fusing is accomplished around the entire periphery of each hole 412, as seen in FIG. 24.

The bag-making machine of the invention can be dimensioned, proportioned and timed to produce bags of various dimensions. For example, polyethylene bags having widths of ⅜ inch to 30 inches and lengths of 1 inch to 24 inches have been produced for various items. Various thicknesses of polyethylene film 51 can be employed, thicknesses from about ¼ to about 20 mils being useful for many purposes. The heat-sealing and perforating plate 202 can be formed with various spacing of teeth 208, such as about 30 teeth per linear inch.

It will be understood that the manufacture of bags from various types and thicknesses of plastic materials requires adjustment of certain operating conditions. Among these are: (1) the sealing pressures exerted by plate 202 upon the folded sheets of plastic material, as determined by the amount of spring force exerted on the plate 202 when the cam 248 has rotated to the sealing position; (2) the temperature of heat-sealing and perforating plate 202 as controlled by thermostat 374; and (3) the time during which the plate 202 is allowed to dwell on the polyethylene film, as related to the frequency of oscillation of the bar 66. In an exemplary adjustment of the bag-making machine, (1) a 5-pound force is exerted by the spring on the plate 202 when the cam 248 has rotated to the sealing position; (2) the plate 202 is electrically heated to 500 degrees Fahrenheit; and (3) the bar 66 oscillates at 50 cycles per minute to produce 50 sealed strips per minute.

Sealing temperatures in the range from about 350 to 500 degrees Fahrenheit can be employed under certain conditions. The selection of the operating conditions depends on the specific nature of the material and the surroundings, as well understood by those skilled in the art.

Referring to FIGS. 3 and 12, the bag machine of the invention can be adapted to form an original roll 50 of polyethylene sheet material 51 into a single array 420 of plastic bags 422 separated by sealed and perforated strips 424. In the bag machine illustrated in FIGS. 3 and 12, those parts similar to parts shown in FIGS. 1, 2 and 4 and 5 are designated by the same reference numerals and are not redescribed in the interest of brevity. A vertical pin 426 assists in folding the plastic sheet 51 so that a lower panel thereof 428 lies beneath the lower surface of support plate 90 and an upper plastic panel passes beneath folding plate 432 to lie over the upper surface of support plate 90. The folding plate 432 includes a horizontal portion 434, an upwardly extending ear 436 and a curved deflector 438. The folding plate 432 also includes an angle piece 440 secured by appropriate bolts 442 to base 444. It will be seen that the array 420 includes bags 422 having lengths twice that of the bags 70 in FIG. 2. The widths of the bags 41 and 42 are also larger. The widths are increased by making appropriate adjustments in the speed of the take-up roll 84, drum 67 and the period of motion of heat-sealing and perforating bar 66.

The larger bags produced by the bag machine shown in FIGS. 3 and 12 are illustrated in FIGS. 27 and 28. The bags 422 have a superior sealing of their sides because of the use of the alternative form of heat-sealing and perforating plate 450 shown in FIG. 15. This bar 450 includes teeth 452 separated by grooves 454 and has flanges 456 and 458 extending vertically adjacent the bases of the teeth 452. Referring to FIGS. 29–31, by use of the heat-sealing and perforating plate 450, sealed and perforated strips 424 are obtained wherein the fused area, indicated by the numeral 460 in FIG. 30, extends for a substantial distance on opposite sides of the spaced holes 462 formed by the teeth 452. Thus the bags 422, which by their size will contain a greater weight of contents, are adapted to remain fluid-tight during use.

It will thus be seen that the invention povides apparatus and methods for forming flexible sheets into arrays of bags sealed on three sides but having an opening for insertion of contents. The bags can be filled with contents, finally sealed, distributed and sold while still attached in any desired submultiples. That is, three, four or a dozen of the bags, still attached by the sealed and perforated strips, can be filled, sealed and sold to a consumer. The connected bags can be stored in one place and, where they are small, will be less readily lost than individual bags. When the consumer desires to use the contents of a bag he may detach the bag from the array by ripping along the perforated line. Then he can open the bag by grasping lip 406 and ripping open the top or severing the plastic bag.

It will be obvious to one skilled in the art that various changes may be made in the invention without departing from the spirit and scope thereof and therefore the invention is not limited by that which is illustrated in the drawings and described in the specification, but only as indicated in the accompanying claim.

What is claimed is:

An array of compartments comprising elongated overlying and underlying fusible sheets, a series of narrow parallel fused seals extending transversely the full width of said sheets and dividing said sheets into multiple compartments, each seal including closely spaced perforations which together extend the length thereof, the portions of the sheets defining the periphery of each perforation being fused together throughout, wherein said seal is formed by the merging of the fused peripheral seals of adjacent perforations.

References Cited in the file of this patent
UNITED STATES PATENTS

| | | |
|---|---|---|
| 693,649 | Johnson | Feb. 18, 1902 |
| 699,875 | Johnston | May 13, 1902 |
| 781,455 | Parmenter | Jan. 31, 1905 |
| 2,087,444 | Potdevin | July 20, 1937 |
| 2,195,740 | Salfisberg | Apr. 2, 1940 |
| 2,237,327 | Bell | Apr. 8, 1941 |
| 2,379,934 | Seiferth | July 10, 1945 |
| 2,444,685 | Waters | July 6, 1948 |
| 2,935,241 | Brady | May 3, 1960 |